(12) United States Patent
Zhou

(10) Patent No.: US 10,048,131 B2
(45) Date of Patent: Aug. 14, 2018

(54) CHROMATICITY TEST METHOD AND CHROMATICITY TEST APPARATUS

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventor: Lijia Zhou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 262 days.

(21) Appl. No.: 14/741,718

(22) Filed: Jun. 17, 2015

(65) Prior Publication Data
US 2016/0131529 A1 May 12, 2016

(30) Foreign Application Priority Data
Nov. 7, 2014 (CN) .......................... 2014 1 0643707

(51) Int. Cl.
*G01J 3/50* (2006.01)
*G01J 3/02* (2006.01)

(52) U.S. Cl.
CPC ............. *G01J 3/506* (2013.01); *G01J 3/0229* (2013.01); *G01J 3/0237* (2013.01); *G01J 3/0248* (2013.01); *G01J 3/0289* (2013.01)

(58) Field of Classification Search
CPC ........ G01J 3/506; G01J 3/0248; G01J 3/0237; G01J 3/0229; G01J 3/0289
See application file for complete search history.

(56) References Cited

U.S. PATENT DOCUMENTS 4,712,889 A * 12/1987 Schindl .............. G02B 21/0096
356/219
D495,361 S 8/2004 Cowie et al.
(Continued)

FOREIGN PATENT DOCUMENTS

CN 101452122 A 6/2009
CN 101886973 A 11/2010
(Continued)

OTHER PUBLICATIONS

"WP214 Imaging Spectral Colorimeter", Westboro Photonics, available at https://web.archive.org/web/20140703225307/http://www.wphotonics.com/docs/WP_WP214_WEB.pdf, Jul. 3, 2014.*
(Continued)

*Primary Examiner* — Dominic J Bologna
(74) *Attorney, Agent, or Firm* — Nath, Goldberg & Meyer; Joshua B. Goldberg

(57) ABSTRACT

The present invention discloses a chromaticity test method and a chromaticity test apparatus. The chromaticity test method comprises the following steps: S1: measuring a size of a pixel of a product to be tested; S2: determining an aperture of a light transmission hole for testing according to the size of the pixel measured in S1; and, S3: selecting a corresponding light transmission hole according to the aperture determined in S2 and then performing a chromaticity test on the product to be tested. By the chromaticity test method provided by the present invention, the waste of time resulted from the inappropriate selection of a light transmission hole is reduced, and the test efficiency is improved while the accuracy of testing is ensured.

17 Claims, 3 Drawing Sheets

(56) References Cited

U.S. PATENT DOCUMENTS

| | | | |
|---|---|---|---|
| 2004/0070332 A1* | 4/2004 | Miller | G09G 3/3216 |
| | | | 313/498 |
| 2005/0052561 A1* | 3/2005 | Altice, Jr. | H04N 5/2351 |
| | | | 348/340 |
| 2005/0100210 A1 | 5/2005 | Rice et al. | |
| 2007/0092446 A1 | 4/2007 | Haddad et al. | |
| 2007/0243525 A1* | 10/2007 | Rigler | C12Q 1/04 |
| | | | 435/5 |
| 2013/0135702 A1* | 5/2013 | Martinez | G03H 1/0841 |
| | | | 359/9 |

FOREIGN PATENT DOCUMENTS

| | | |
|---|---|---|
| CN | 102288526 A | 12/2011 |
| CN | 102538672 A | 7/2012 |
| CN | 102715981 A | 10/2012 |
| CN | 203178063 U | 9/2013 |
| CN | 203758619 U | 8/2014 |
| CN | 101996616 B | 2/2015 |
| EP | 0 183 416 A2 | 6/1986 |

OTHER PUBLICATIONS

Huang, et al. (CN102715981), English machine translation, Oct. 10, 2012.*
1st office action issued in Chinese application No. 201410643707.4 dated Dec. 1, 2015.
"Chromaticity and Brightness Test Principle and Equipment" (English translation of paragraphs issued in Chinese application No. 201410643707.4 dated Dec. 1, 2015).
Office Action dated Jul. 25, 2016 issued in corresponding Chinese Application No. 201410643707.4.

* cited by examiner

CHROMATICITY TEST METHOD AND CHROMATICITY TEST APPARATUS

FIELD OF THE INVENTION

The present invention relates to the technical field of display, in particular to a chromaticity test method and a chromaticity test apparatus.

BACKGROUND OF THE INVENTION

During the manufacturing process of display products, it is often required to test chromaticity coordinates of a color film. The existing chromaticity coordinate testing technology focuses on how to collect accurate light and how to reduce the diameter of a light spot for testing in order to satisfy the testing of a pixel having narrow line width. However, the smaller the light spot for testing is, the longer the test time is. For example, using a light spot with a diameter of 2 µm to test the chromaticity of a pixel having a line width of 50 µm will cause the waste of time.

A light transmission hole is arranged in a chromaticity test apparatus, and a light beam transmits through the light transmission hole to form the light spot. For the same light beam, the size of the light spot for testing is changed by changing the size of the light transmission hole. In the prior art, usually, the light transmission hole for corresponding testing is prepared according to the related information described on a product package. However, during an actual test, it is possible that the light transmission hole is selected inappropriately or even wrongly, so that the accuracy of test data cannot be ensured and the time is wasted.

SUMMARY OF THE INVENTION

An objective of the present invention is to provide a chromaticity test method and a chromaticity test apparatus in order to improve test efficiency while ensuring the accuracy of testing.

To solve the above technical problem, as a first aspect of the present invention, a chromaticity test method for performing a chromaticity test by using a chromaticity test apparatus is provided, wherein the chromaticity test apparatus includes a chromatographic analysis device and a test head, the test head includes light transmission holes, and the method includes the following steps:

S1: measuring a size of a pixel of a product to be tested;

S2: determining an aperture of a light transmission hole for testing according to the size of the pixel measured in S1; and S3: selecting a corresponding light transmission hole according to the aperture determined in S2, and then performing a chromaticity test on the product to be tested.

Preferably, S3 includes:

S31: judging whether an aperture of a currently used light transmission hole meets test requirements;

S32: testing the product to be tested if the aperture of the currently used light transmission hole meets the test requirements; and S33: replacing the currently used light transmission hole with a corresponding light transmission hole for testing according to the aperture determined in S2 if the aperture of the currently used light transmission hole does not meet the test requirements;

wherein S31 includes:

judging whether the aperture of the currently used light transmission hole is consistent with the aperture determined in S2.

Preferably, S1 includes:

S11: acquiring an image of the pixel of the product to be tested;

S12: calculating a gray value of the pixel according to the image of the pixel acquired in S11; and S13: calculating the size of the pixel according to the gray value calculated in S12.

Preferably, the pixel includes a plurality of sub-pixels, and the size includes a width of each of the sub-pixels of the pixel.

Preferably, S2 further includes:

S21a: comparing the size of the pixel of the product to be tested with a pre-stored size of a sample pixel; and S22a: determining the aperture of the light transmission hole for testing according to a result of comparison.

Preferably, in step 22a, when the width of each of the sub-pixels is greater than 25 µm, a light transmission hole having an aperture of 20 µm is selected; and, when the width of each of the sub-pixels is less than 25 µm, a light transmission hole having an aperture of 10 µm is selected.

As a second aspect of the present invention, a chromaticity test apparatus is further provided, including a chromatographic analysis device and a test head, wherein the chromatographic analysis device includes:

a measurement module, configured to measure a size of a pixel of a product to be tested; and a control module, connected to the measurement module and configured to determine an aperture of a light transmission hole for testing according to the measured size of the pixel of the product to be tested;

the test head includes:

a light transmission hole switcher, which is provided thereon with a plurality of light transmission holes having different apertures, connected to the control module and configured to select a corresponding light transmission hole according to the aperture determined by the control module so as to perform testing.

Preferably, the control module is further configured to judge whether an aperture of a currently used light transmission hole meets test requirements; and, if the aperture of the currently used light transmission hole does not meet the test requirements, the control module controls the light transmission hole switcher to switch to a corresponding light transmission hole for testing.

Preferably, the measurement module includes an image collection sub-module configured to acquire an image of the pixel of the product to be tested.

Preferably, the image collection sub-module includes a charge-coupled device.

Preferably, the measurement module further includes an image processing sub-module configured to calculate a gray value of the pixel according to the image of the pixel of the product to be tested and calculate the size of the pixel according to the gray value of the pixel.

Preferably, the chromatographic analysis device further includes a comparison module, wherein the comparison module is pre-stored with a size of a sample pixel therein, the comparison module is connected to the measurement module and configured to compare the size of the pixel of the product to be tested with the size of the sample pixel and feed back a result of comparison to the control module, and the control module determines the aperture of the light transmission hole for testing according to the result of comparison.

In the present invention, before a chromaticity test, the size of a pixel of a product to be tested is first measured in real time, then an appropriate light transmission hole is selected for testing according to the real-time measured information, so that the waste of time resulted from inappropriate selection of a light transmission hole is reduced, and the test efficiency is improved while the accuracy of testing is ensured.

BRIEF DESCRIPTION OF THE DRAWINGS

The drawings are used for providing further understanding of the present invention, and constitute a part of the description. The drawings together with the following specific embodiments are used for explaining the present invention, but not intended to constitute any limitation to the present invention.

DETAILED DESCRIPTION OF THE EMBODIMENTS

The specific embodiments of the present invention will be described as below in detail with reference to the drawings. It should be understood that the specific embodiments described herein are merely for describing and explaining the present invention but not indented to limit the present invention.

The present invention provides a chromaticity test method for performing a chromaticity test by using a chromaticity test apparatus. The method is particularly suitable for testing chromaticity coordinates of a display product.

Figure 1:
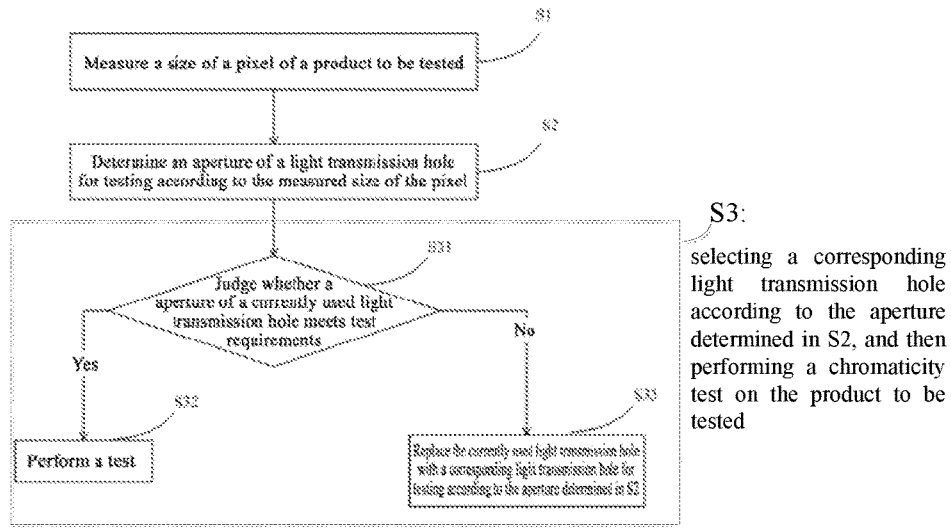
FIG. 1 is a flowchart of a chromaticity test method according to an embodiment of the present invention.

FIG. 1 is a flowchart of the chromaticity test method, including the following steps:

S1: measuring a size of a pixel of a product to be tested;

S2: determining an aperture of a light transmission hole for testing according to the size of the pixel measured in S1; and S3: selecting a corresponding light transmission hole according to the aperture determined in S2, and then performing a chromaticity test on the product to be tested.

During a chromaticity test, it is often required to allow the size of a light spot for testing to match with the size of a pixel of a product to be tested, in order to ensure the accuracy of testing and save the test time. For a same light beam, the size of the light spot for testing may be changed by changing the size of a light transmission hole in the chromaticity test apparatus.

In the present invention, before a chromaticity test, the size of a pixel of a product to be tested is first measured in real time to acquire actual size information of the pixel of the product to be tested, and then an appropriate light transmission hole is selected according to the real-time measured information to perform an accurate chromaticity test. Therefore, the method provided by the present invention reduces the waste of time resulted from the inappropriate selection of a light transmission hole, and improves the test efficiency while ensuring the accuracy of testing.

Further, S3 includes:

S31: judging whether an aperture of a currently used light transmission hole meets test requirements;

S32: testing the product to be tested if the aperture of the currently used light transmission hole meets the test requirements; and S33: replacing the currently used light transmission hole with a corresponding light transmission hole for testing according to the aperture determined in S2 if the aperture of the currently used light transmission hole does not meet the test requirements;

wherein S31 includes:

judging whether the aperture of the currently used light transmission hole is consistent with the aperture determined in S2.

In the method provided by the present invention, a light transmission hole having an appropriate aperture is selected for testing according to the actual size information of the pixel of the product to be tested measured in real time, in order to allow the test range of a light transmission hole to match with the size of the pixel, so that the utilization of the corresponding test device can be improved, thereby improving productivity and saving cost.

In the present invention, the size of the pixel of the product to be tested may be acquired by many methods. For example, S1 may include the following steps:

S11: acquiring an image of the pixel of the product to be tested;

S12: calculating a gray value of the pixel according to the image of the pixel acquired in S11; and S13: calculating the size of the pixel according to the gray value calculated in S12.

Specifically, the acquired image of the pixel is analytically calculated by image processing software to obtain the gray value of the pixel. Then, by analyzing a boundary of "black" and "white" regions represented by the gray value, the size of the pixel is calculated. The pixel includes a plurality of sub-pixels, and the size described herein mainly refers to the linewidth of each of the sub-pixels, specifically, the width of a shorter side of a red, green or blue sub-pixel.

In the present invention, the light transmission hole may be selected directly by the acquired size of the pixel, or a corresponding light transmission hole may be selected for chromaticity test after comparing the acquired size of the pixel with the size of a sample pixel and then making a judgment.

For example, S2 may include the following steps:

S21a: comparing the size of the pixel of the product to be tested with a pre-stored size of a sample pixel; and S22a: determining the aperture of the light transmission hole for testing according to the result of comparison.

For example, there are two light transmission holes to be selected, i.e., a light transmission hole having an aperture of 10 μm and a light transmission hole having an aperture of 20 μm, wherein the light transmission hole having an aperture of 10 μm is suitable for testing a pixel having a linewidth of less than 25 μm, while the light transmission hole having an aperture of 20 μm is suitable for testing a pixel having a linewidth of greater than 25 μm.

Therefore, it may be set that, when the measured linewidth of the pixel of the product to be tested is greater than 25 μm, the light transmission hole having an aperture of 20 μm is selected; and, when the measured linewidth of the pixel of the product to be tested is less than 25 μm, the light transmission hole having an aperture of 10 μm is selected. Of course, if the measured linewidth of the pixel of the product to be tested is equal to 25 μm, either of the above light transmission holes may be selected.

In addition, the image of the product to be tested may further be compared with a pre-stored image of a sample pixel. The image comparison is substantially size comparison and will not be repeated herein.

The key point of the present invention is that the actual size information of the pixel of the product to be tested is acquired in advance. Selecting a light transmission hole having a matched aperture for a chromaticity test according to the actual size information of the pixel of the product to be tested not only ensures the accuracy of the chromaticity test, but also reduces the waste of time resulted from the frequent debugging of an inappropriate light transmission hole and thus improves test efficiency.

Figure 2:
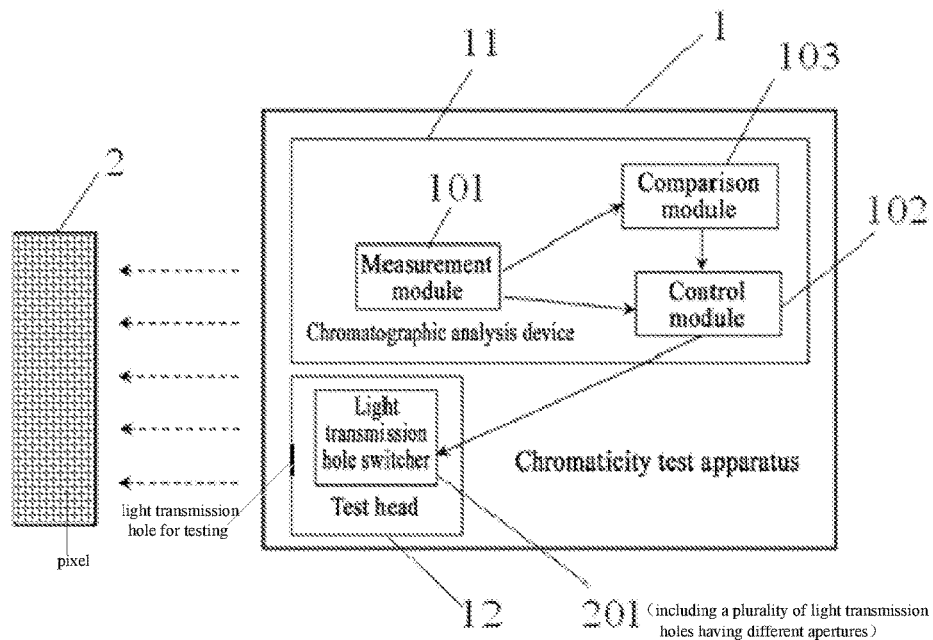
FIG. 2 is a structural diagram of a chromaticity test apparatus according to an embodiment of the present invention.
Figure 3:
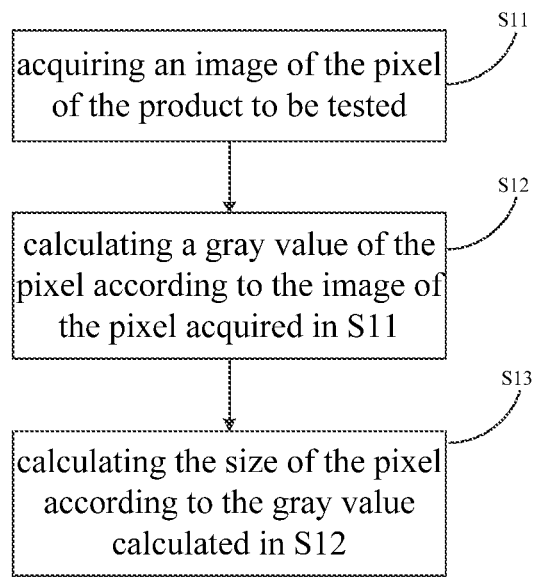
FIG. 3 is a flowchart according to an embodiment.
Figure 4:
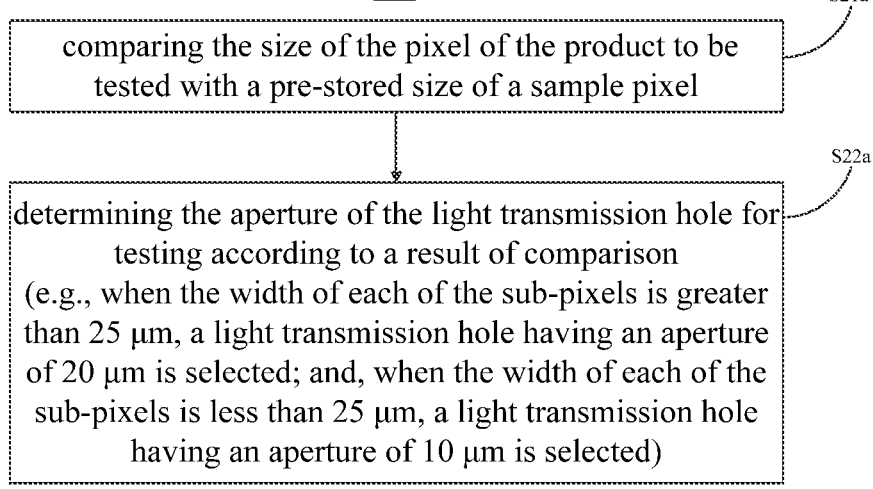
FIG. 4 is a flowchart according to an embodiment.
Figure 5:
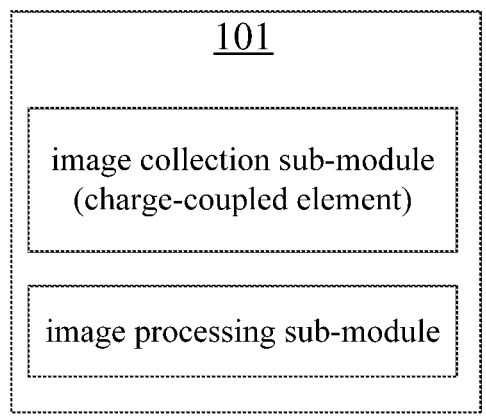
FIG. 5 depicts an embodiment of the measurement module.

The present invention further provides a chromaticity test apparatus, as shown in FIG. 2. The chromaticity test apparatus 1 includes a chromatographic analysis device 11 and a test head 12, wherein the chromatographic analysis device 11 includes:

a measurement module 101, configured to measure the size of a pixel of a product 2 to be tested; and a control module 102, connected to the measurement module 101 and configured to determine an aperture of a light transmission hole for testing according to the measured size of the pixel of the product 2 to be tested;

the test head 12 includes:

a light transmission hole switcher 201, which is provided thereon with a plurality of light transmission holes having different apertures, connected to the control module 102 and configured to select a corresponding light transmission hole according to the aperture determined by the control module 102 so as to perform testing.

The control module 102 is further configured to judge whether the aperture of the currently used light transmission hole meets the test requirements. If the aperture of the currently used light transmission hole does not meet the test requirements, the control module 102 controls the light transmission hole switcher 201 to switch to a corresponding light transmission hole to perform testing.

Compared with an existing chromaticity test apparatus, the chromaticity test apparatus provided by the present invention can measure actual size information of the pixel of the product to be tested in real time, and then select a light transmission hole having an appropriate aperture according to the actual size information of the pixel of the product to be tested measured in real time to perform a chromaticity test. Therefore, the chromaticity test apparatus provided by the present invention not only improves the accuracy of testing, but also avoids the waste of time resulted from the inappropriate selection of the light transmission hole and thus improves test efficiency.

Specifically, the measurement module 101 may include an image collection sub-module configured to acquire an image of the pixel of the product 2 to be tested. The image collection sub-module includes, for example, a Charge-Coupled Device (CCD) or an image sensor in other forms.

In addition, the measurement module 101 may further include an image processing sub-module configured to calculate a gray value of the pixel according to the image of the pixel of the product 2 to be tested acquired by the image collection sub-module and then calculate the size of the pixel according to the gray value of the pixel. The specific calculation method is described as above.

In the chromaticity test apparatus provided by the present invention, the size of the pixel of the product 2 to be tested acquired by the measurement module 101 may be directly fed back to the control module 102, and then the control module 102 controls the light transmission hole switcher 201 to switch to a corresponding light transmission hole to perform testing. Alternatively, the chromatographic analysis device 11 may further include a comparison module 103. The comparison module 103 is pre-stored with the size of a sample pixel therein. The comparison module 103 is connected to the measurement module 101 and configured to compare the size of the pixel of the product 2 to be tested with the size of the sample pixel and feed back the result of comparison to the control module 102. The control module 102 determines the aperture of the light transmission hole for testing according to the result of comparison.

In addition, the image of a sample pixel may be further pre-stored in the comparison module 103, then the image of the pixel of the product 2 to be tested is compared with the image of the sample pixel, and the light transmission hole is selected according to the result of comparison.

In the chromaticity test apparatus provided by the present invention, a light transmission hole having an appropriate aperture is selected for testing according to the actual size information of the pixel of the product to be tested measured in real time, in order to allow the test range of a light transmission hole to match with the size of the pixel, so that the utilization of the test device can be improved, the waste of time resulted from the frequent debugging and replacement of a light transmission hole is reduced, and it is advantageous for improving production efficiency and saving cost.

It may be understood that, the above embodiments are exemplary embodiments merely used to describe the principle of the present invention, and the present invention is not limited thereto. For a person of ordinary skill in the art, various variations and improvements may be made without departing from the spirit and essence of the present invention, and those variations and improvements should also be regarded as falling into the protection scope of the present invention.

The invention claimed is:

1. A chromaticity test method for performing a chromaticity test by using a chromaticity test apparatus, wherein the chromaticity test apparatus comprises a chromatographic analysis device and a test head, the test head comprises light transmission holes, wherein the method comprises the following steps of:
    S1: measuring a size of a pixel of a color filter to be tested;
    S2: determining an aperture of a light transmission hole for performing a chromaticity test according to the size of the pixel measured in S1; and
    S3: selecting a corresponding light transmission hole according to the aperture determined in S2, and then performing a chromaticity test on the color filter to be tested.

2. The chromaticity test method according to claim 1, wherein S3 comprises:
    S31: judging whether an aperture of a currently used light transmission hole meets test requirements;
    S32: testing the color filter to be tested if the aperture of the currently used light transmission hole meets the test requirements; and
    S33: replacing the currently used light transmission hole with a corresponding light transmission hole for testing according to the aperture determined in S2 if the aperture of the currently used light transmission hole does not meet the test requirements;
    wherein S31 comprises:
    judging whether the aperture of the currently used light transmission hole is consistent with the aperture determined in S2.

3. The chromaticity test method according to claim 2, wherein S1 comprises:
S11: acquiring an image of the pixel of the color filter to be tested;
S12: calculating a gray value of the pixel according to the image of the pixel acquired in S11; and
S13: calculating the size of the pixel according to the gray value calculated in S12.

4. The chromaticity test method according to claim 1, wherein S1 comprises:
S11: acquiring an image of the pixel of the color filter to be tested;
S12: calculating a gray value of the pixel according to the image of the pixel acquired in S11; and
S13: calculating the size of the pixel according to the gray value calculated in S12.

5. The chromaticity test method according to claim 1, wherein the pixel comprises a plurality of sub-pixels, and the size comprises a width of each of the sub-pixels of the pixel.

6. The chromaticity test method according to claim 5, wherein S2 further comprises:
S21a: comparing the size of the pixel of the color filter to be tested with a pre-stored size of a sample pixel; and
S22a: determining the aperture of the light transmission hole for testing according to a result of comparison.

7. The chromaticity test method according to claim 6, wherein, in step 22a, when the width of each of the sub-pixels is greater than 25 µm, a light transmission hole having an aperture of 20 µm is selected; and, when the width of each of the sub-pixels is less than 25 µm, a light transmission hole having an aperture of 10 µm is selected.

8. A chromaticity test apparatus, comprising a chromatographic analysis device and a test head, wherein the chromatographic analysis device comprises:
a measurement module, configured to measure a size of a pixel of a color filter to be tested; and
a control module, connected to the measurement module and configured to determine an aperture of a light transmission hole for performing a chromatographic test according to the measured size of the pixel of the color filter to be tested;
the test head comprises:
a light transmission hole switcher, which is provided thereon with a plurality of light transmission holes having different apertures, connected to the control module and configured to select a corresponding light transmission hole according to the aperture determined by the control module so as to perform testing.

9. The chromaticity test apparatus according to claim 8, wherein the control module is further configured to judge whether an aperture of a currently used light transmission hole meets test requirements; and, if the aperture of the currently used light transmission hole does not meet the test requirements, the control module controls the light transmission hole switcher to switch to a corresponding light transmission hole for testing.

10. The chromaticity test apparatus according to claim 9, wherein the chromatographic analysis device further comprises a comparison module, wherein the comparison module is pre-stored with a size of a sample pixel therein, the comparison module is connected to the measurement module and configured to compare the size of the pixel of the color filter to be tested with the size of the sample pixel and feed back a result of comparison to the control module, and the control module determines the aperture of the light transmission hole for testing according to the result of comparison.

11. The chromaticity test apparatus according to claim 8, wherein the measurement module comprises an image collection sub-module configured to acquire an image of the pixel of the color filter to be tested.

12. The chromaticity test apparatus according to claim 11, wherein the image collection sub-module comprises a charge-coupled element.

13. The chromaticity test apparatus according to claim 12, wherein the chromatographic analysis device further comprises a comparison module, wherein the comparison module is pre-stored with a size of a sample pixel therein, the comparison module is connected to the measurement module and configured to compare the size of the pixel of the color filter to be tested with the size of the sample pixel and feed back a result of comparison to the control module, and the control module determines the aperture of the light transmission hole for testing according to the result of comparison.

14. The chromaticity test apparatus according to claim 11, wherein the measurement module further comprises an image processing sub-module configured to calculate a gray value of the pixel according to the image of the pixel of the color filter to be tested and calculate the size of the pixel according to the gray value of the pixel.

15. The chromaticity test apparatus according to claim 14, wherein the chromatographic analysis device further comprises a comparison module, wherein the comparison module is pre-stored with a size of a sample pixel therein, the comparison module is connected to the measurement module and configured to compare the size of the pixel of the color filter to be tested with the size of the sample pixel and feed back a result of comparison to the control module, and the control module determines the aperture of the light transmission hole for testing according to the result of comparison.

16. The chromaticity test apparatus according to claim 11, wherein the chromatographic analysis device further comprises a comparison module, wherein the comparison module is pre-stored with a size of a sample pixel therein, the comparison module is connected to the measurement module and configured to compare the size of the pixel of the color filter to be tested with the size of the sample pixel and feed back a result of comparison to the control module, and the control module determines the aperture of the light transmission hole for testing according to the result of comparison.

17. The chromaticity test apparatus according to claim 8, wherein the chromatographic analysis device further comprises a comparison module, wherein the comparison module is pre-stored with a size of a sample pixel therein, the comparison module is connected to the measurement module and configured to compare the size of the pixel of the color filter to be tested with the size of the sample pixel and feed back a result of comparison to the control module, and the control module determines the aperture of the light transmission hole for testing according to the result of comparison.

* * * * *